United States Patent [19]

Amara et al.

[11] Patent Number: 4,475,952
[45] Date of Patent: Oct. 9, 1984

[54] TREATING CONCRETE

[75] Inventors: Louis J. Amara, Hartford; Peitro Paoletti; Benito J. Tavana, both of Wethersfield, all of Conn.

[73] Assignee: Invictus Unlimited, Inc., Hartford, Conn.

[21] Appl. No.: 527,720

[22] Filed: Aug. 30, 1983

Related U.S. Application Data

[63] Continuation-in-part of Ser. No. 288,577, Jul. 30, 1981, Pat. No. 4,402,753.

[51] Int. Cl.³ .............................................. C04B 7/354
[52] U.S. Cl. ...................................... 106/94; 106/239; 106/314; 106/315
[58] Field of Search ................. 106/94, 239, 314, 315, 106/116

[56] References Cited

U.S. PATENT DOCUMENTS

| 2,191,338 | 2/1940 | Clark | 106/239 |
| 2,491,045 | 12/1949 | Holmes | 106/94 |
| 2,671,030 | 3/1954 | Gobel et al. | 106/94 |
| 2,952,062 | 9/1960 | Tillman | 106/239 |
| 3,063,851 | 11/1962 | Madison | 106/94 |
| 3,477,979 | 11/1969 | Hillyer | 106/94 |
| 3,545,991 | 12/1970 | Body | 106/239 |
| 3,900,332 | 8/1975 | Davis | 106/94 |

*Primary Examiner*—James Poer
*Attorney, Agent, or Firm*—Beveridge, DeGrandi & Kline

[57] ABSTRACT

A liquid composition is disclosed which is useful in the fabrication of concrete articles. The composition may be used to coat molds or forms into which freshly mixed concrete is poured, or it may be used as an additive to the concrete. Formed of a diesel fuel oil and rosin, the mixture is found to result in speeding up of the curing of the freshly poured concrete, water proofing of concrete, fireproofing concrete and acting as a rust inhibitor. Additionally, the mixture enables the reduction in thickness of cast sections without sacrificing strength. Also, the mixture enables freshly made concrete to be used for bonding to old concrete to obtain a very strong bond.

11 Claims, No Drawings

TREATING CONCRETE

REFERENCE TO A RELATED APPLICATION

This is a continuation-in-part of our copending patent application Ser. No. 288,577 filed July 30, 1981, the entire disclosure of which is relied on and incorporated herein by reference, now U.S. Pat. No. 4,402,753.

Concrete is the most widely used structural and civil engineering material today. Ranging from use in the fabrication of small objects such as concrete block, patio block, fence posts and street light standards to the creation of large constructions such as roadways, bridges, dams, office buildings and institutional buildings, as well as massive off shore oil production platform facilities, concrete has in the last 40 years become an universal material having the most divergent application of any construction material that has ever been known.

Raw materials used in making concrete are found in abundance throughout the world and its technology is well suited to capital intensive and highly mechanized technology in the industrial nations as well as to labor intensive and low technology applications in the developing world and less industrialized countries. As is well known, concrete is a conglomerate of strong, but chemically inert, aggregate such as natural sand and stones or artificial mineral materials which is bound together by a matrix of mineral cement. The cement hardens and gains strength over a period of time as a result of chemical reactions with water. Before it hardens, the ingredients for concrete can be mixed into a plastic mass and shaped or molded into virtually any desired configuration.

The history of cement goes back many centuries; the ancient Egyptians used hydrated lime and gypsum cements for pyramid building. The Greeks and Romans developed a mortar for many of their buildings which was made by heating limestone, primarily calcium carbonate, to form lime. The lime was then reacted with water to form slaked lime. However, this mortar tended to crack and crumble when exposed to weather so that the Greeks and Romans gradually developed a stronger cement which was a hydraulic cement; that is, a cement reacted with water, which was called "pozzolana". This was a cement made from finely ground lime, sand and some vulcanic material which was found in particular near the Italian town of Pozzuoli. The Romans found that when water was added to this material it caused it to set into a hardened condition. This type of cement was used in building both the Pantheon and the Colosseum in Rome. The discovery of the Romans remained in use until the late 18th century. Then in 1824 Joseph Aspdin of England obtained a patent for an artificial cement which he called "portland" because the concrete made from it resembled a famous well known building stone used in those days which was obtained from the Isle of Portland off the coast of England. The cement made in accordance with the patent of Aspdin became known as "portland" cement to distinguish it from the natural cement or the pozzolana cements.

The composition of portland cement and various other cements as well as its history are matters that are well known in the industry and, for example, is described in *The Chemical Process Industries* by Shreve, 1945, McGraw-Hill Book Company, pages 188–200 and *The Illustrated Science and Invention Encyclopedia*, page 636 et seq. H. S. Stuttman Company, Inc., New York, N.Y.

Cement is a complex combination of four principal constituents which are made in dry form by partial fusion. When water is added to this mixture, it reacts to form an interlocking mass of great strength and hardness. The four main constitutents are tricalcium silicate, $3CaO.SiO_2$; tricalcium aluminate, $3CaO.Al_2O_3$, dicalcium silicate $3CaO.SiO_2$ and tetracalcium aluminoferrite, $4CaO.Al_2O_3.Fe_2O_3$. The addition of water to these anhydrous compounds causes chemical reactions to occur. These are matters which are well known in the art and many publications exist describing the chemistry of cement and concrete and the mechanisms and formulations which are typically used in the building industry.

Equally well known in the art is the fact that good curing of the concrete is essential. The strength, durability and appearance of the finished concrete depends on the care that goes into the mixing, placing and subsequent treatment of the mix when it is fresh and still in the plastic condition. The various ingredients must be thoroughly mixed and this is conventionally done with machine mixing. The mixing can be done on the site or in central batching and mixing plants with the fresh concrete taken to the site in revolving drum, ready mixed trucks. For large objects, it is necessary that the concrete be thoroughly compacted to insure complete filling of the forms and to expel all unwanted air from the mix. For thin concrete slabs and smaller objects such as block, the concrete can be compacted by vibrating the entire mold. Equipment and techniques for vibrating concrete are also well known. If desired, the surface of the cast concrete can then be made smooth by an convenient means. If concrete is allowed to dry too fast, it is likely to be ruined and therefore a slow, controlled evaporation of the water is a key part of the curing process. This can be done by sprinkling the newly hardening concrete with water and covering it with plastic sheeting. Also steam curing may be resorted to, as is well known in the industry.

The present invention relates to the use of a liquid composition for the purpose of treating concrete and to obtain a number of improvements including waterproofing concrete articles, fire proofing the concrete, treatment to prevent rusting and the formation of strong concrete patches. The composition of the invention acts on the fresh concrete mix to convert it into a gel-like consistency, as a result of which the freshly molded concrete article can be moved from the mold much sooner than is the case with conventional practices. Since the mold is emptied sooner by following the teachings of this invention, it is possible to use the mold again more rapidly and recharge it with another batch of concrete to form the next article in the production schedule. The present invention therefore enables a great increase in productivity.

It has been found that the liquid composition of the present invention retains the water in the concrete mixture for a longer period of time than is the case with conventional practices. Therefore, it is not necessary to spray the molded or cast concrete article with water or to treat it with steam in order to bring about the controlled curing of the concrete. The present invention can be used with any conventional batch of concrete mix and can be used with any suitable molding or forming equipment used to make articles of any desired shape, e.g. panels of any desired thickness, fence posts, concrete blocks, patio blocks, wall panels, roadways, building walls, and the numerous other articles that may be conveniently made out of concrete.

The liquid composition of the present invention can be used in a variety of ways. For example, it can be used to produce water-proof concrete articles; that is, concrete articles that will resist water and moisture penetration. This permits the fabrication of containers, tanks, planters and the like which will retain water. In producing such a water-proof article, an effective amount of the additive is introduced into and mixed with a fresh concrete batch and shaped into the desired form.

In another aspect of the invention a concrete article can be produced which will be fire resistant, for example, resist a blow torch at close range without cracking. To produce an article formed of concrete which possesses the desirable property of being able to withstand extremely high temperatures, an effective amount of the additive is mixed in with a fresh batch of concrete and thereafter shaped and cured to obtain the desired article.

A frequent problem with concrete articles that are reinforced with metal such as iron, steel and the like is the problem of rusting and discoloration of the concrete. This invention enables the production of a shaped concrete article containing a metal member that under the usual conditions would have a tendency to rust but which when formed in accordance with the invention will resist rust formation. This is accomplished by coating the metal members with the additive of the invention prior to or simultaneously with immersion with the fresh concrete batch. The method may also be carried out by treating the fresh concrete batch with the addition of the invention and then contacting the metal member therewith. Applicants have found the concrete structures prepared in accordance with this feature of the invention will be rust free for an indefinite period of time.

Another problem in the concrete business that is solved by the present invention resides in the difficulty of patching or repairing "old" concrete. As anyone knows who has ever attempted to repair a cracked concrete driveway, walls, steps, surfaces or the like, when fresh concrete is applied to old concrete a long lasting bond is generally not obtainable. This often necessitates replacements of large segments of old concrete when only a small portion thereof required repair. By means of the present invention, it is now possible to patch old concrete by incorporating an effective amount of the liquid additive into the freshly prepared concrete batch and applying the fresh concrete so modified to the cracked or broken portion. When cured the patch is long lasting and forms a bond with the old concrete that is stronger than the original old concrete.

The liquid composition provided by the invention impregnates the concrete and acts as a gelling agent to solidify the concrete into a gel or gel-like consistency. At that point, the gelled concrete mass in the shape and configuration conforming to the mold can be removed from the mold very conveniently and without damage or deteriorating the molded article. It has been found that the liquid provided by this invention retards the rotting of wood and retards oxidation of metal, and as a consequence molds made of wood or metal (e.g. steel) can enjoy a longer production life-time when treated with the composition of this invention.

Molded concrete articles produced in accordance with this invention can be removed from the mold in a shorter period of time than is the case when operating by traditional methods. For example, a concrete panel 2 inches thick and 7 feet long and 2 feet wide can be removed in less than 1 minute. Any defects in the finishing of or in the appearance of the molded article, such as cracks, can be corrected quickly before the concrete is set or dry. If it is not possible to correct the defect, the gelled concrete can be immediately returned to the batch and recast as desired. Thus, practice of the methods described herein reduces or eliminates waste "seconds" and discards.

Whereas typically, depending on the size it takes from several hours to several days to dry a molded concrete article in the traditional and usual practice of casting and curing concrete, when utilizing the liquid composition of the present invention the molded article can solidify in a far shorter period of time, for example, in a few minutes to several hours, again depending upon the size of the product. Thus, the present invention increases not only the speed and production of freshly molded uncured articles, but it shortens the curing time whereby the product can be placed in use in a far shorter time.

In its action as a curing compound, the composition of the invention acts to increase the productivity by as much as a factor of 10. This is because of the fact that the molded article can be removed from the mold in a relatively short time as compared to the conventional practice. For example, whereas a standard production schedule may involve the formation of 10 units within a given time, the present invention permits a 10 fold increase in production up to 100 units in the same amount of time.

Not only does the present invention permit an increase in speed and productivity, but it has been determined that the strength of the concrete is substantially improved; i.e. on the order of double or triple the strength which is normally obtained. This means that the thickness of a particular structural concrete item may be substantially reduced without sacrificing the strength characteristics.

Concrete articles made in accordance with the present invention such as building panels, building blocks and the like can also be insulated by the incorporation of a conventional insulating material.

Further in accordance with another embodiment of the present invention, it has been found that the liquid composition of this invention can be utilized as an additive to the concrete to result in a water proofing treatment of the concrete, such that for example, a wall formed of the concrete in a thickness of one inch would permit litle or no seepage of water over a very long period of time. Walls of greater thicknesses have greatly increased resistance to water penetration. All types of concrete containers such as tanks, planters, troughs and the like may be fabricated in accordance with this invention. Of particular interest is the lining of waterways and irrigation systems.

Therefore, because the compositions of the present invention is a water proofing agent and will not permit water to permeate through, concrete compositions made in accordance with this invention are particularly important with regard to the maintenance of roadways. The concrete compositions produced in accordance with the present invention have good bonding capability to existing concrete roadways and therefore can be conveniently used in the resurfacing of the existing roadway surfaces. For this purpose, the liquid composition of the present invention can be mixed directly into the concrete as an additive to obtain all of the desirable attributes previously described.

In another embodiment of the invention, there is provided a method to overcome a common problem encountered with concrete which is the appearance of rust stains on the surfaces of a reinforced structure. Rust stains on concrete are caused by oxidation or rusting of the metal reinforcing elements within the concrete structure. The action of moisture and air on the surfaces of the metal, usually iron or steel, reinforcement members causes rusting. The rust permeates through the concrete to the surface where it appears as an unsightly discoloration. With the use of the liquid compositions described herein rusting is retarded due to a coating which is formed around the iron or steel reinforcing elements when the treated concrete surrounds its surfaces. As an alternative, the metal reinforcement members may first be coated with the liquid composition of this invention before being immensed in the freshly prepared concrete.

The composition of the present invention can also be mixed with a variety of other cement or concrete material such as pumice and slag in order to make a structural concrete block. Dyes, stains, pigments and the like may also be incorporated into the liquid composition of the invention.

In another embodiment of the invention, there is provided a method for rendering concrete fire proof; that is resistant to high temperature flames including the ability to withstand exposure to a blow torch without cracking. In carrying out this aspect of the invention, an effective amount of the liquid treating mixture of diesel fuel oil and rosin is mixed with and dispersed into the fresh concrete batch which is then shaped or cast into the desired article, form or body.

Another problem that is alleviated by the present invention is the long standing problem of patching old concrete. It is well known that it is difficult, if not impossible, to form a long lasting bond between old concrete and a fresh batch. It has now been found that by means of the present invention it is possible to prepare good patching compositions by mixing an effective amount of the liquid composition of this invention into a freshly prepared batch of concrete and thereafter patching the old concrete and permitting the fresh concrete to cure.

The liquid composition which is utilized in accordance with the afore desired invention is formed from a selected petroleum oil fraction; namely, diesel fuel oil and a product obtaining from a naturally occurring material; namely, rosin.

In more particular detail, the petroleum oil fraction used in accordance with the invention is diesel fuel oil. Diesel oil typically has a hydrogen content of 13 and a carbon content of 85 on a gravimetric basis, as fired. The content of $O_2+N_2+S$ is expressed as 2.0. The specific gravity according to the American Petroleum Institute ranges from 22 to 28. See *Perry's Handbook of Chemical Engineering,* 3rd Edition, page 1654. It has been found that Texaco Diesel Chief oil is particularly suitable for practice of the invention. Generally, any diesel fuel oil fraction having these or similar characteristics will be suitable for the purposes of the invention.

Rosin is sometimes also known as colophony and is derived from various species of pine trees, which when tapped yield an oleoresinous product known as crude turpentine. Steam distillation removes the oil of turpentine and leaves the solid rosin. Ranging in color from pale yellow to dark brown, rosin is usually soft, brittle and practically transparent. It has an aromatic odor and is soluble in alcohol, acetic acid and volatile and mixed oils. Typically, the specific gravity ranges from 1.045 to 1.085. The softening point is about 75° C. or 167° F. with a melting point of about 120° to 135° C. With regard to its chemistry, rosin consists almost entirely of abietic acid possibly in the form of isomers thereof. The characteristics and properties of rosins are well known in the art. Rosin is described for example on page 404 of *Handbook of Plastics* by Simonds and Ellis, Van Nostrand Company, New York, N.Y., 6th Edition, and also in the *Handbook of Chemical Synonyms and Tradenames,* 8th Edition, CRC Press, Cleveland, Ohio, page, 195. These references are incorporated herein by reference.

In carrying out the preferred aspects of the invention, a concentrate of the diesel fuel oil and the rosin is first prepared. Generally, the solid rosin is first added to the diesel oil in a container and the container is then heated to a temperature sufficient to melt the rosin in the oil. This may be accomplished by placing the diesel oil in an open glass container and then adding the solid rosin. The glass container is then placed in a water bath and the temperature of the water bath is raised to its boiling point; i.e. 100° C., and the heating is continued until the rosin has dissolved in the oil. It is preferred to agitate or stir the mixture to aid in the dissolution of the rosin at the elevated temperature. It should be noted that any suitable mixing vessel may be used for this purpose.

The rosin-oil concentrate may be stored until ready to use or to be shipped to the ultimate customer for use. When ready for production, the producer or manufacturer of the concrete articles then takes the rosin-oil concentrate and dilutes it somewhat by adding it to additional oil to obtain the desired formulation. The composition is then ready for use as the additive or modification agent and can be used to coat the molds or casting forms wherein the freshly poured concrete is then subjected to the action of the composition of the invention. It is important to prevent the additive of the invention from freezing as the substances may tend to separate and may be difficult to adequately remix.

The chemical changes which take place in the modification of the rosin and the reaction with the concrete are not well understood but the result is a gelling of the concrete which brings about a very rapid gain in the structural strength of the concrete as a result of which more rapid curing of the concrete is obtained. Moreover, the concrete is converted into a usable proudct in a far shorter time period than is the case when employing conventional additives.

The following example is intended to illustrate the invention without limiting it in any fashion.

The following composition is used to make a batch of concentrated mixture consisting of 1 quart of diesel oil and 1 cup (200 grams) of rosin. The rosin used in this example is sold under the brand name, Nancy Gum Rosin, Union Camp, Jacksonville, Fla. The diesel oil utilized is Texaco Diesel Chief brand. Two cups amounting to approximately 16 ounces of the diesel oil and 1 cup of approximately 200 grams of the rosin are added to an open glass container. The open glass container is then placed in a water batch which is heated to the boiling point of the water. The mixture is heated for about 15 to 25 minutes, stirring with a steel spoon, until the rosin has melted. An additional amount of diesel oil at room temperature is then added to the contents in the glass container to provide a total of 1 measured quart (32 oz.) The glass container and contents are then removed from the water bath and cooled to room temperature. The resulting concentrated rosin-oil mixture may then be stored until ready to use. At that point, the concentrate is then added at a ratio of 4.5 gallons of diesel oil to 1 quart of concentrated rosin-oil mixture.

The diluted additive is then ready for application to the molds or for incorporation into a batch of freshly mixed concrete. This diluted mixture may be stirred or mixed mechanically or agitated to obtain a dispersion of the rosin in the oil. If left to stand, the rosin may precipitate to the bottom of the container. In plant or on-site combining of the concentrate is recommended in order to save on shipping costs for the diluted mixture.

This composition so prepared may then be used in a wide variety of ways. Illustratively, it may be used for coating a mold for making 1'×1'×2" patio block into which freshly mixed concrete is poured and vibrated. Sufficient liquid composition of the invention is used to completely wet the entire surfaces of the mold. After approximately 1 minute, the concrete molded patio block may be removed from the mold and placed on a surface to cure and dry. It will be observed that the block is of a gel-like consistency having sufficient strength to retain its dimensions on the support surface. After about 24 hours under ambient conditions, the block is fully cured and can be utilized.

In addition to the simple patio block given by way of illustration above, it should be understood that various other articles may be cast in a similar fashion. Complex and intricate shapes may be cast using the liquid composition of the invention. Illustratively, elaborately shaped decorative concrete fencing can be made according to the invention because the molded article rapidly gels and develops sufficient strength to be removed from the mold and set aside to cure. The production rate of such molded articles can thereby be significantly increased.

When used as an additive for incorporation into the concrete mix before casting, such as a road surface, the liquid additive of the invention is used in the amount of about 0.1% to 20% by volume, preferably 2-10% by volume, of the concrete. When mixed with a freshly mixed concrete batch, the liquid composition of the present invention enables the preparation of excellent patching or repair compositions. The difficulties in bonding new concrete or cement to old concrete or cement surfaces are well known—the first freeze frequently results in rupture of the bond. With the liquid composition of the invention, the composition is mixed with the concrete or cement and then is ready for use as a patching composition. It has been demonstrated that very strong bonds are formed when using the liquid composition of the invention, which will resist breaking or separation. In fact, the bond is so strong that blows by a sledge hammer only resulted in breakage of the underlying original concrete.

Concrete does not need to be cast entirely on the construction site. One of the great advantages is that individual beams, planks, blocks or whole wall units can be cast away from the actual site and brought to the construction site as needed. Besides reducing on site work in congested areas, precast construction permits the casting itself, finishing and detailing to be carried out under factory conditions affording standards of quality control that are difficult to achieve at the site. Also, standardized beams and other units can be formed in long life, high precision steel molds for use in a wide variety of structural and architectual applications. Of course for purposes of the present invention, the mold can be formed of any convenient material and need not be a steel mold.

In general, it has been found that the ratio of oil to solid resin in order to make the initial concentrate should be about (16 fluid ounces/200 gram) or 0.08 fluid ounces oil to 1 gram of rosin. Then the initial concentrate is diluted up to the volume of about 32 fluid ounces to 200 grams or 0.16 fluid ounces oil to 1 gram rosin. The range of proportions for the final concentrate may be about 0.12–0.2 fluid ounces oil to 1 gram rosin or about 25 to 40 ounces oil to 200 grams rosin.

When used for application to molds and the like, the concentrate of this invention is generally diluted in additional oil to a suitable concentration of for example, 4.5 gallons oil to 1 quart (32 fluid ounces) of concentrate. This may also vary, for example, from 4 to 5 gallons oil to 1 quart of concentrate. The precise values will vary somewhat depending on the applications and uses of the end product, the composition of the concrete, and the like.

Fireproofing of concrete articles may be achieved by casting concrete into molds coated with the liquid composition of the present invention and permitting the cast article to be vibrated to insure uniform distribution of the liquid composition throughout the concrete. Alternately, the liquid mixture of the invention may be mixed with the concrete batch and shaped into the desired form. It has been demonstrated that concrete panels made in this fashion resist the high temperature flames generated by a blow torch used to cut steel. Proportions may vary but the general statement given above applies here as well.

In like manner, the liquid composition of the invention can be used to produce a water proof cement product. For example, the liquid composition of the invention may be used to coat a mold into which a concrete or cement article is cast. By vibrating fresh concrete batch in the coated mold, the liquid composition may be caused to diffuse throughout the concrete to bring about a greater densification than is possible to obtain without use of the composition of the invention. For certain applications, it may be more convenient to incorporate the liquid composition directly into the concrete batch in which case vibration is not needed to bring about a uniform distribution of the ingredients where concrete mixing equipment is used. As a general rule, the proportions may vary widely, with those given above being suitable for customary purposes.

Another advantage of the liquid composition of the present invention resides in its ability to function as both an air entrainment agent and as a water reducer. Air entrainment is well known and recognized in the art and relates to the very finely divided and highly uniformly dispersed air pockets or bubbles throughout the concrete mixture. This may be observed upon fracturing a concrete article produced in accordance with this invention. Upon inspection, it will be observed that greater and more uniform air entrainment is achieved than is the case when the present invention is not followed. Because the liquid composition of the invention also functions as a water reducer, less water may be used when fabricating a shaped concrete article with only so much water being used as will be sufficient to hydrate the cement. Therefore, the cement and concrete mixtures prepared for use in accordance with this invention generally contain less water and are noticeably drier than are conventional concrete mixtures which do not contain additives.

When casting articles in accordance with the invention, it will be apparent that reinforcing networks of iron, steel and the like may be used in the same manner as when pouring or casting with conventional compositions and using conventional techniques.

Poured and molded articles prepared in accordance with the methods described herein have been observed to possess high strength, in fact, considerably greater strength than conventional concrete articles of equal thickness. Therefore, when using the techniques of this invention, the thickness of articles may be reduced. Also, because of increased strength, the proportion of aggregate such as stone, gravel and the like may be reduced or, in certain instances, eliminated. Light weight material such as pumice may be used in accordance with the present invention whereas in conventional methods such materials were not always suitable.

To further illustrate the advantage of the present invention, the following example was carried out:

1. Approximately 4 parts sand, 3 parts ¼" stone, and 1 part Type 1 Portland cement, forming a concrete mix was blended together in a vertical shaft type mixer. Sufficient water was added to achieve a good mixture. The resulting mix appeared to be quite dry to the touch.

2. Portions of the above mix were than placed into various mold forms which had been coated by a rag with the invention admixture used as a form oil. The first mold form, that of an ornamental fence with members about 1½×2" thick was placed on a vibrating table and filled with concrete. While the form was being vibrated, the concrete was screeded and the surface smoothed over with a trowel. The mold form with concrete was then removed from the vibration table, carried about 10 feet where it was quickly inverted onto the floor and then lifted vertically leaving the molded concrete on the floor. Although still plastic to the touch, the concrete held the shape imparted to it by the form, with no deformation. Minor imperfections in the surface were able to be reworked and corrected with a trowel. This took place within 5 minutes after the form had been filled and screeded.

3. A car bumper block form also coated with the liquid composition of the invention was then filled with the concrete mix on the vibrating table, vibrated, screeded, and smoothed off. In a similar fashion to that used for the ornamental fence, the filled bumper form was quickly carried about 15 feet, inverted onto the floor, and lifted vertically. The concrete in the car bumper block form was about 3 times greater in thickness than the fence mold, and again held its shape very well.

4. The third form, a fence post cap, was also prepared in the above manner, inverted on the floor and removed from the concrete. This concrete article also retained its shape. Minor surface imperfections, such as small air holes, were corrected using a small rod type finishing tool.

5. A previously cast, hardened, panel which was made with a concrete mix of essentially the same proportions as the above mix, was then struck with a sledge hammer until fractured. Inspection of the fracture planes revealed that the fracture was through the individual pieces of coarse aggregate and not through the bond of the cement paste to the aggregate.

Test cube specimens were taken of previously cast and molded concrete articles, all produced in accordance with the invention. The test results are given below:

|  | Bumper Block | Post-Riser | Panel | Panel |
|---|---|---|---|---|
| Area | 16,506 sq. in. | 4.516 sq. in. | 4.250 sq. in. | 3.66 sq. in. |
| Total Load | 49,800 Lbs. | 6,400 | 11,600 Lbs. | 10,600 Lbs. |
| Unit Load | 3017 Psi | 1417 Psi | 2729 Psi | 2896 Psi |
| Age When Tested | 5 days | 7 days | Approx. 2 months |  |
| Remarks | Cube Was cured in lime-water solution for 48 hours | Cube was cured in lime-water solution for 48 hours | Cube was cured in lime-water solution for 48 hours | Cube was cured in lime-water solution for 48 hours |
| Time | 2 hours | 1 hour | 1 hour | 1 hour |

As a part of the additional testing, it was determined to fabricate cylinders made from trial batches of concrete, some with and some without the liquid composition of the invention.

All batching was manual and done with buckets, a scale being used to determine weight of mixed elements. The mix used for the test cylinders was of the same proportions as the mix presently being used in normal commercial production of fence sections, panels, and the like.

The testing program was designed for three sets of cylinders; set X fabricated with no formula of the invention at all, set Y with the formula of the invention used as a precoat on the cylinder molds, and set Z employing the formula of the invention as an actual admixture in the concrete mix.

All samples were vibrated on the vibration table for fifty seconds to insure uniformity. All three batches were mixed for a minimum of 5 minutes. Due to the water reducing properties of the formula of the invention, the set fabricated with the formula received 7.5 lbs. less water than did the other two batches.

All specimens were marked and left uncovered at the site. Each set contained 5 subsets of 3 to be broken. One cylinder of each batch was fabricated as a spare, also to be broken.

REPORT OF TEST OF CONCRETE CYLINDEERS - SLUMP TEST

CEMENT TYPE: Portland Type 1 (Lone Star)  
CEMENT LBS.: 94*  
FINE AGGREGATE, LBS.: 211*  
COARSE AGGREGATE, LBS.: 327*  
ADMIXTURE: 5 oz. Formula of the invention*  
AMBIENT TEMP: 58° 9:30 a.m.  
SPECIMEN SIZE: 6"  
SPECIMEN AREA: 28.27 sq. in.  
SPECIMEN CONDITION: Satisfactory  
CURING: Saturated lime/water solution WATER: 49¼ lbs.*

| LAB. NO. | AGE, DAYS | TOTAL LOAD, LBS. | UNIT LOAD, PSI | SLUMP IN. | AIR % | CONC. TEMP.° | TYPE FRACTURE |
|---|---|---|---|---|---|---|---|
| A | 1 | 28,500 | 1008 | 4 | 11.5 | 80 | 4 |
| A | 4 | 53,000 | 1875 | 4 | 11.5 | 80 | 3 |
| A | 7 | 70,000 | 2476 | 4 | 11.5 | 80 | 4 |
| A | 28 | 88,000 | 3113 | 4 | 11.5 | 80 | 4 |

REPORT OF TEST OF CONCRETE CYLINDERS - X

SAMPLE TYPE: Set X, no formula used in any way  
CEMENT TYPE: Portland Type 1 (Lone Star)  
CEMENT LBS.: 94*  
FINE AGGREGATE, LBS.: 284*  
COARSE AGGREGATE, LBS.: 196*  
ADMIXTURE: None  
WATER: 52 lbs.*  
AMBIENT TEMP: 68° 1:00 p.m.  
SPECIMEN SIZE: 6"  
SPECIMEN AREA: 28.27 sq. in  
SPECIMEN CONDITION: Satisfactory  
CURING: None Applied

| LAB. NO. | AGE, DAYS | TOTAL LOAD, LBS. | UNIT LOAD, PSI | SLUMP IN. | AIR % | CONC. TEMP.° | TYPE FRACTURE |
|---|---|---|---|---|---|---|---|
| X-1 | 1 | 59,000 | 2087 | Less | NA | 80 | 4 |
| X-1 | 1 | 60,000 | 2122 | Than |  |  | 4 |
| X-1 | 1 | 64,500 | 2281 | 1" |  |  | 5 |
| X-2 | 2 | 84,500 | 2989 |  |  |  | 2 |
| X-2 | 2 | 79,000 | 2794 |  |  |  | 1 |
| X-2 | 2 | 84,000 | 2971 |  |  |  | 3 |
| X-3 | 3 | 91,500 | 3237 |  |  |  | 3 |
| X-3 | 3 | 91,500 | 3237 |  |  |  | 2 |
| X-3 | 3 | 91,000 | 3219 |  |  |  | 2 |
| X-4 | 7 | 112,000 | 3962 |  |  |  | 2 |
| X-4 | 7 | 95,000 | 3360 |  |  |  | 4 |
| X-4 | 7 | 112,500 | 3979 |  |  |  | 4 |
| X-6 | 28 | 134,500 | 4758 |  |  |  | 3 |
| X-6 | 28 | 133,500 | 4722 |  |  |  | 1 |
| X-6 | 28 | 134,500 | 4404 |  |  |  | 3 |
| X-7 | Spare |  |  |  |  |  |  |
| X-1 | 1 | 59,000 | 2087 | Less | NA | 80 | 4 |
| X-1 | 1 | 60,000 | 2122 | Than |  |  | 4 |
| X-1 | 1 | 64,500 | 2281 | 1" |  |  | 5 |
| X-2 | 2 | 84,500 | 2989 |  |  |  | 2 |
| X-2 | 2 | 79,000 | 2794 |  |  |  | 1 |
| X-2 | 2 | 84,000 | 2971 |  |  |  | 3 |
| X-3 | 3 | 91,500 | 3237 |  |  |  | 3 |
| X-3 | 3 | 91,500 | 3237 |  |  |  | 2 |
| X-4 | 7 | 112,000 | 3962 |  |  |  | 2 |
| X-4 | 7 | 95,000 | 3360 |  |  |  | 4 |
| X-4 | 7 | 112,500 | 3979 |  |  |  | 4 |
| X-6 | 28 | 130,000 | 4598 |  |  |  | 3 |
| X-6 | 28 | 136,000 | 4811 |  |  |  | 3 |
| X-6 | 28 | 136,500 | 4828 |  |  |  | 2 |
| X-7 | Spare |  |  |  |  |  |  |

REPORT OF TEST OF CONCRETE CYLINDERS - Y

SAMPLE TYPE: Set Y, formula used for form oil only  
CEMENT TYPE: Portland Type 1 (Lone Star)  
CEMENT LBS.: 94*  
FINE AGGREGATE, LBS.: 284*  
COARSE AGGREGATE, LBS.: 196*  
ADMIXTURE: None  
WATER: 52 lbs.*  
AMBIENT TEMP: 63° 1:00 p.m.  
SPECIMEN SIZE: 6"  
SPECIMEN AREA: 28.27 sq. in.  
SPECIMEN CONDITION: Satisfactory  
CURING: None Applied

| LAB. NO. | AGE, DAYS | TOTAL LOAD, LBS. | UNIT LOAD, PSI | SLUMP IN. | AIR % | CONC. TEMP.° | TYPE FRACTURE |
|---|---|---|---|---|---|---|---|
| Y-1 | 1 | 64,500 | 2281 | Less | NA | 80 | 5 |
| Y-1 | 1 | 61,000 | 2158 | Than |  |  | 5 |
| Y-1 | 1 | 65,000 | 2299 | 1" |  |  | 4 |
| Y-2 | 2 | 88,000 | 3113 |  |  |  | 3 |
| Y-2 | 2 | 90,500 | 3201 |  |  |  | 3 |
| Y-2 | 2 | 80,000 | 2830 |  |  |  | 3 |
| Y-3 | 3 | 109,000 | 3855 |  |  |  | 2 |
| Y-3 | 3 | 106,000 | 3750 |  |  |  | 3 |
| Y-3 | 3 | 100,000 | 3537 |  |  |  | 2 |
| Y-4 | 7 | 127,000 | 4492 |  |  |  | 4 |
| Y-4 | 7 | 118,000 | 4174 |  |  |  | 4 |
| Y-4 | 7 | 121,500 | 4298 |  |  |  | 4 |
| Y-6 | 28 | 130,000 | 4598 |  |  |  | 3 |
| Y-6 | 28 | 136,000 | 4811 |  |  |  | 3 |
| Y-6 | 28 | 136,500 | 4828 |  |  |  | 2 |
| Y-7 | Spare |  |  |  |  |  |  |

REPORT OF TEST OF CONCRETE CYLINDERS - Z

SAMPLE TYPE: Set Z, formula used as admixture    AMBIENT TEMP: 68° 1:00 p.m.

-continued

CEMENT TYPE: Portland Type 1 (Lone Star)  
CEMENT LBS.: 94*  
FINE AGGREGATE, LBS.: 284*  
COARSE AGGREGATE, LBS.: 196*  
ADMIXTURE: None  
WATER: 44.5 lbs.*  
SPECIMEN SIZE: 6"  
SPECIMEN AREA: 28.27 sq. in.  
SPECIMEN CONDITION: Satisfactory  
CURING: None Applied

| LAB. NO. | AGE, DAYS | TOTAL LOAD, LBS. | UNIT LOAD, PSI | SLUMP IN. | AIR % | CONC. TEMP. | TYPE FRACTURE |
|---|---|---|---|---|---|---|---|
| Z-1 | 1 | 64,000 | 2264 | 8 | NA | 72 | 4 |
| Z-1 | 1 | 64,000 | 2264 | | | | 4 |
| Z-1 | 1 | 65,000 | 2299 | | | | 4 |
| Z-2 | 2 | 83,500 | 2953 | | | | 3 |
| Z-2 | 2 | 87,500 | 3095 | | | | 3 |
| Z-2 | 2 | 82,500 | 2918 | | | | 3 |
| Z-3 | 3 | 92,000 | 3254 | | | | 1 |
| Z-3 | 3 | 97,500 | 3449 | | | | 2 |
| Z-3 | 3 | 95,000 | 3360 | | | | 3 |
| Z-4 | 7 | 111,500 | 3944 | | | | 2 |
| Z-4 | 7 | 113,000 | 3997 | | | | 4 |
| Z-4 | 7 | 116,000 | 4108 | | | | 4 |
| Z-6 | 28 | 136,500 | 4828 | | | | 3 |
| Z-6 | 28 | 133,000 | 4705 | | | | 2 |
| Z-6 | 28 | 138,000 | 4881 | | | | 3 |
| Z-7 | Spare | | | | | | |

REMARKS:  
*An air test comparing concrete mixed without formula of the invention and with formula was carried out. Using proportions found in a trial mix design a mix was formulated without formula of the invention and tested for slump and air content. These tests revealed a 2" slump and 2% air content. The mix then received 5 oz. of the formula of the invention and tested for slump and air. With no other additives, except for the formula of the invention, the mix revealed an 11.5% air content and a 4" slump. Four test cylinders were taken of the mix after the formula of the invention was added. These 4 specimens were fabricated and cured in accordance with ASTM Procedures.

The fracture number indicates a scale of from 1 to 5 of standard fracture types as utilized in the industry by testing laboratories such as The Minges Materials Testing Laboratory, Inc., Avon, Conn.

Further modifications and variations will be apparent to those skilled in the art and are intended to be encompassed by the claims which follow.

We claim:

1. A method for water-proofing a shaped concrete article comprising providing a fresh concrete mixture and treating said mixture before curing with an effective amount of a liquid mixture of diesel fuel oil and rosin, said rosin being dispersed in said diesel fuel oil, and thereafter permitting the concrete article to dry to form a desired article which is resistant to penetration by water.

2. The method of claim 1, wherein the liquid mixture is prepared from a concentrate wherein the ratio of oil to rosin is about 0.16 fluid ounces of oil to 1 gram of rosin.

3. The method of claim 1, wherein the liquid mixture is prepared from a concentrate wherein the ratio of oil to rosin is about 0.12 to 0.2 fluid ounces oil to 1 gram rosin.

4. The method of claim 1, wherein a fresh concrete batch is mixed with said liquid mixture and is shaped into a container and subsequently is permitted to cure to obtain a water resistant concrete container.

5. A method for rendering a shaped concrete article resistant to fire comprising incorporating into a fresh batch of concrete an effective amount of a liquid mixture of diesel fuel oil and rosin, said rosin being dispersed in said diesel fuel oil and thereafter permitting said concrete article to cure to form an article which is resistant to fire.

6. A method for producing an anti-rusting treatment for concrete comprising contacting a metallic element with a liquid mixture of diesel fuel oil and rosin, said rosin being dispersed in said diesel fuel oil and a batch of fresh concrete and thereafter permitting said concrete to cure to form a concrete article resistant to rusting.

7. The method of claim 6 wherein the metallic element is first treated with said liquid mixture and thereafter is immersed in a fresh concrete batch.

8. The method of claim 6 wherein a metallic element is first coated with said liquid mixture and then fresh concrete batch is poured around said metallic element to immerse the metallic element.

9. A method of patching old concrete which consists essentially of preparing an adequate amount of a fresh batch of concrete mix containing an effective amount of a liquid mixture of diesel fuel oil and rosin, said rosin being dispersed in said diesel fuel oil, and applying said fresh batch to the portion of the old broken concrete to be repaired and shaping the fresh batch to conform with the intended configuration whereby patching of the old concrete is possible without removing the old concrete.

10. The method of claim 9 wherein the fresh batch is shaped and positioned between two old portions of concrete to form a strong bond between the old concrete portions.

11. The method of claim 9 wherein the fresh batch contains from 2 to 10% by volume.

* * * * *